(12) United States Patent
Luo et al.

(10) Patent No.: US 7,977,437 B2
(45) Date of Patent: *Jul. 12, 2011

(54) PROCESS FOR PRODUCING POLYDIENES

(76) Inventors: Steven Luo, Copley, OH (US); Kevin M. McCauley, Coventry Township, OH (US); Jason T. Poulton, Akron, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 12/815,841

(22) Filed: Jun. 15, 2010

(65) Prior Publication Data

US 2010/0273963 A1 Oct. 28, 2010

Related U.S. Application Data

(63) Continuation of application No. 11/967,549, filed on Dec. 31, 2007, now Pat. No. 7,741,418.

(51) Int. Cl.
*C08F 2/38* (2006.01)
*C08F 2/02* (2006.01)
*C08F 4/52* (2006.01)

(52) U.S. Cl. ........ 526/142; 526/144; 526/153; 526/164; 526/209

(58) Field of Classification Search .................. 526/142, 526/144, 153, 164, 209
See application file for complete search history.

(56) References Cited

U.S. PATENT DOCUMENTS

| | | | |
|---|---|---|---|
| 3,297,667 A | 1/1967 | von Dohlen et al. | |
| 3,541,063 A | 11/1970 | Throckmorton et al. | |
| 3,794,604 A * | 2/1974 | Throckmorton et al. | 502/153 |
| 4,336,405 A | 6/1982 | Idelson | |
| 4,429,089 A | 1/1984 | Pedretti et al. | |
| 4,461,883 A | 7/1984 | Takeuchi et al. | |
| 4,696,984 A | 9/1987 | Carbonaro et al. | |
| 4,710,553 A | 12/1987 | Carbonaro et al. | |
| 4,736,001 A | 4/1988 | Carbonaro et al. | |
| 4,906,706 A | 3/1990 | Hattori et al. | |
| 4,931,376 A | 6/1990 | Ikematsu et al. | |
| 4,990,573 A | 2/1991 | Andreussi et al. | |
| 5,021,379 A | 6/1991 | Martin et al. | |
| 5,064,910 A | 11/1991 | Hattori et al. | |
| 5,567,784 A | 10/1996 | Wieder et al. | |
| 5,844,050 A | 12/1998 | Fukahori et al. | |
| 6,136,931 A * | 10/2000 | Jang et al. | 526/133 |
| 6,197,713 B1 * | 3/2001 | Lynch | 502/102 |
| 7,148,299 B2 | 7/2003 | Kaita et al. | |
| 6,683,140 B2 | 1/2004 | Kaita et al. | |
| 6,699,813 B2 | 3/2004 | Luo et al. | |
| 6,759,497 B2 | 7/2004 | Grün et al. | |
| 6,838,526 B1 | 1/2005 | Sone et al. | |
| 6,977,281 B1 | 12/2005 | Ozawa et al. | |
| 6,992,147 B1 | 1/2006 | Ozawa et al. | |
| 7,008,899 B2 | 3/2006 | Luo et al. | |
| 7,094,849 B2 | 8/2006 | Luo et al. | |
| 7,294,680 B2 | 11/2007 | Sone et al. | |
| 7,351,776 B2 | 4/2008 | Tartamella et al. | |
| 7,642,322 B2 | 1/2010 | Ozawa et al. | |
| 7,671,136 B2 | 3/2010 | Ozawa et al. | |
| 7,671,138 B2 | 3/2010 | Luo | |
| 7,687,589 B2 | 3/2010 | Tartamella et al. | |
| 7,732,534 B2 | 6/2010 | Luo et al. | |
| 7,741,418 B2 | 6/2010 | Luo et al. | |
| 7,750,087 B2 | 6/2010 | Ozawa et al. | |
| 7,825,201 B2 | 11/2010 | Luo et al. | |
| 2007/0149717 A1 | 6/2007 | Luo et al. | |
| 2008/0146745 A1 | 6/2008 | Luo et al. | |
| 2008/0182954 A1 | 7/2008 | Luo et al. | |

FOREIGN PATENT DOCUMENTS

| | | |
|---|---|---|
| EP | 1939221 | 7/2008 |
| GB | 2101616 | 1/1983 |
| JP | 05-051406 A | 3/1993 |
| JP | 05-059103 A | 3/1993 |
| JP | 10-306113 A | 11/1998 |
| JP | 11-035633 A | 2/1999 |

OTHER PUBLICATIONS

Z. Shen, J. Ouyang, F. Wang, Z. Hu, F. Yu, and B. Qian, Journal of Polymer Science: Polymer Chemistry Edition, 1980, vol. 18, pp. 3345-3357.
H. L. Hsieh, H. C. Yeh, Rubber Chemistry and Technology, 1985, vol. 58, pp. 117-145.
D. J. Wilson, Journal of Polymer Science, Part A, Polymer Chemistry, 1995, vol. 33, pp. 2505-2513.
R. P. Quirk, A. M. Kells, Polymer International, 2000, vol. 49, pp. 751-756.
J-H Yang, M. Tsutsui, Z. Chen, D. E. Bergbreiter, Macromolecules, 1982, vol. 15, pp. 230-233.
Kaita et al, Stereospecific Polymerization of 1,3-Butadiene with Samarocene-Based Catalysts, Macromolecules, 1999, 32, 9078-9079.
Office Action for U.S. Appl. No. 11/964,848, Luo, et al., "Method for Producing Functionalized cis-1,4-Polydienes Having High ci-1,4-Linkage Content and High Functionality."
European Search Report, European Application No. 08254180, dated Jul. 9, 2009; 7 pages.

* cited by examiner

*Primary Examiner* — Fred M Teskin
(74) *Attorney, Agent, or Firm* — Meredith Hooker; Arthur M. Reginelli

(57) ABSTRACT

A process for preparing a polydiene, the process comprising the step of polymerizing conjugated diene monomer in the presence of a dihydrocarbyl ether, where said step of polymerizing employs a lanthanide-based catalyst system.

22 Claims, No Drawings

PROCESS FOR PRODUCING POLYDIENES

This application is a continuation of U.S. Non-Provisional application Ser. No. 11/967,549, now U.S. Pat. No. 7,741,418, filed on Dec. 31, 2007, which is incorporated herein by reference.

FIELD OF THE INVENTION

One or more embodiments of the present invention are directed toward a process for producing polydienes, the process comprising polymerizing conjugated diene monomer with a lanthanide-based catalyst system in the presence of a dihydrocarbyl ether.

BACKGROUND OF THE INVENTION

Polydienes may be produced by solution polymerization, wherein conjugated diene monomer is polymerized in an inert solvent or diluent. The solvent serves to solubilize the reactants and products, to act as a carrier for the reactants and product, to aid in the transfer of the heat of polymerization, and to help in moderating the polymerization rate. The solvent also allows easier stirring and transferring of the polymerization mixture (also called cement), since the viscosity of the cement is decreased by the presence of the solvent. Nevertheless, the presence of solvent presents a number of difficulties. The solvent must be separated from the polymer and then recycled for reuse or otherwise disposed of as waste. The cost of recovering and recycling the solvent adds greatly to the cost of the polymer being produced, and there is always the risk that the recycled solvent after purification may still retain some impurities that will poison the polymerization catalyst. In addition, some solvents such as aromatic hydrocarbons can raise environmental concerns. Further, the purity of the polymer product may be affected if there are difficulties in removing the solvent.

Polydienes may also be produced by bulk polymerization (also called mass polymerization), wherein conjugated diene monomer is polymerized in the absence or substantial absence of any solvent, and, in effect, the monomer itself acts as a diluent. Since bulk polymerization is essentially solventless, there is less contamination risk, and the product separation is simplified. Bulk polymerization offers a number of economic advantages including lower capital cost for new plant capacity, lower energy cost to operate, and fewer people to operate. The solventless feature also provides environmental advantages, with emissions and waste water pollution being reduced.

Despite its many advantages, bulk polymerization requires very careful temperature control, and there is also the need for strong and elaborate stirring equipment since the viscosity of the polymerization mixture can become very high. In the absence of added diluent, the high cement viscosity and exotherm effects can make temperature control very difficult. Consequently, local hot spots may occur, resulting in degradation, gelation, and/or discoloration of the polymer product. In the extreme case, uncontrolled acceleration of the polymerization rate can lead to disastrous "runaway" reactions. To facilitate the temperature control during bulk polymerization, it is desirable that a catalyst gives a reaction rate that is sufficiently fast for economical reasons but is slow enough to allow for the removal of the heat from the polymerization exotherm in order to ensure the process safety.

Lanthanide-based catalyst systems that comprise a lanthanide compound, an alkylating agent, and a halogen source are known to be useful for producing conjugated diene polymers having high cis-1,4-linkage contents. Nevertheless, when applied to bulk polymerization of conjugated dienes, lanthanide-based catalyst systems, especially those comprising an aluminoxane compound as a catalyst component, often give excessively fast polymerization rates, which makes it very difficult to control the temperature and compromises the process safety. Therefore, it is desirable to develop a method of moderating the bulk polymerization of conjugated dienes catalyzed by lanthanide-based catalysts.

It is also known that cis-1,4-polydienes having higher cis-1,4-linkge content exhibit the increased ability to undergo strain-induced crystallization and thus give superior physical properties such as higher tensile strength and higher abrasion resistance. Therefore, it is desirable to develop a method for producing cis-1,4-polydienes having higher cis-1,4-linkage content in both solution and bulk polymerization systems.

SUMMARY OF THE INVENTION

On or more embodiments of the present invention provide a process for preparing a polydiene, the process comprising the step of polymerizing conjugated diene monomer in the presence of a dihydrocarbyl ether, where said step of polymerizing employs a lanthanide-based catalyst system.

Other embodiments provide a process for preparing a polydiene, the process comprising the step of introducing (a) conjugated diene monomer, (b) a lanthanide compound, (c) an alkylating agent, (d) a halogen-containing compound, and (e) a dihydrocarbyl ether.

Other embodiments provide a catalyst system comprising the combination of or reaction product of (a) a lanthanide compound, (b) an alkylating agent, (c) a halogen-containing compound, (d) a dihydrocarbyl ether, and optionally (e) conjugated diene monomer.

Still other embodiments provide a cis-1,4-polydiene prepared by a process comprising the step of polymerizing conjugated diene monomer with a lanthanide-based catalyst system including the combination of or reaction product of (a) a lanthanide compound, (b) an alkylating agent, (c) a halogen-containing compound, and (d) a dihydrocarbyl ether.

DETAILED DESCRIPTION OF ILLUSTRATIVE EMBODIMENTS

According to one or more embodiments of the present invention, polydienes are produced by polymerizing conjugated diene monomer with a lanthanide-based catalyst system in the presence of a dihydrocarbyl ether. The presence of a dihydrocarbyl ether has been found to offer a number of advantages. Where a lanthanide-based catalyst system is designed to yield cis-1,4-polydienes, the presence of a dihydrocarbyl ether advantageously increases the cis-1,4-linkage content of the resulting polydiene as compared to polydienes produced in the absence of a dihydrocarbyl ether. The presence of a dihydrocarbyl ether is particularly advantageous in bulk polymerization systems because it has been discovered that the presence of a dihydrocarbyl ether modulates the polymerization rate and thereby facilitates temperature control and reduces the risk of runaway reactions in bulk polymerization.

Practice of one or more embodiments of the present invention is not limited by the selection of any particular lanthanide-based catalyst. In one or more embodiments, the catalyst composition may include a lanthanide compound, an alkylating agent, and a halogen-containing compound that includes one or more labile halogen atoms. Where the lanthanide compound and/or alkylating agent include one or more labile halogen atoms, the catalyst need not include a separate halogen-containing compound; e.g., the catalyst may simply include a halogenated lanthanide compound and an alkylating agent. In certain embodiments, the alkylating agent may include both an aluminoxane and at least one other organoaluminum compound. In yet other embodiments, a compound containing a non-coordinating anion, or a non-coordinating anion precursor, i.e. a compound that can undergo a chemical reaction to form a non-coordinating anion, may be employed in lieu of a halogen-containing compound. In one embodiment, where the alkylating agent includes an organoaluminum hydride compound, the halogen-containing compound may be a tin halide as disclosed in U.S. Pat. No. 7,008,899, which is incorporated herein by reference. In these or other embodiments, other organometallic compounds, Lewis bases, and/or catalyst modifiers may be employed in addition to the ingredients or components set forth above. For example, in one embodiment, a nickel-containing compound may be employed as a molecular weight regulator as disclosed in U.S. Pat. No. 6,699,813, which is incorporated herein by reference.

In one or more embodiments, polydienes are produced according to the present invention by introducing (a) conjugated diene monomer, (b) a lanthanide compound, (c) an alkylating agent (d) a halogen-containing compound, and (e) a dihydrocarbyl ether. In certain embodiments, the dihydrocarbyl ether can be combined with the other catalyst components to form a catalyst system that includes the combination of or reaction product of a lanthanide compound, an alkylating agent, a halogen-containing compound, and a dihydrocarbyl ether.

In one or more embodiments, examples of conjugated diene monomer that can be polymerized according to the present invention include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

Various lanthanide compounds or mixtures thereof can be employed. In one or more embodiments, these compounds may be soluble in hydrocarbon solvents such as aromatic hydrocarbons, aliphatic hydrocarbons, or cycloaliphatic hydrocarbons. In other embodiments, hydrocarbon-insoluble lanthanide compounds, which can be suspended in the polymerization medium to form the catalytically active species, are also useful.

Lanthanide compounds may include at least one atom of lanthanum, neodymium, cerium, praseodymium, promethium, samarium, europium, gadolinium, terbium, dysprosium, holmium, erbium, thulium, ytterbium, lutetium, and didymium. Didymium may include a commercial mixture of rare-earth elements obtained from monazite sand.

The lanthanide atom in the lanthanide compounds can be in various oxidation states including but not limited to the 0, +2, +3, and +4 oxidation states. Lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

Without wishing to limit the practice of the present invention, further discussion will focus on neodymium compounds, although those skilled in the art will be able to select similar compounds that are based upon other lanthanide metals.

Neodymium carboxylates include neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (a.k.a. neodymium versatate), neodymium naphthenate, neodymium stearate, neodymium oleate, neodymium benzoate, and neodymium picolinate.

Neodymium organophosphates include neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl) phosphate, neodymium didecyl phosphate, neodymium didodecyl phosphate, neodymium dioctadecyl phosphate, neodymium dioleyl phosphate, neodymium diphenyl phosphate, neodymium bis (p-nonylphenyl) phosphate, neodymium butyl (2-ethylhexyl) phosphate, neodymium (1-methylheptyl) (2-ethylhexyl) phosphate, and neodymium (2-ethylhexyl) (p-nonylphenyl) phosphate.

Neodymium organophosphonates include neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl) phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl) (1-methylheptyl)phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl)phosphonate, neodymium butyl (2-ethylhexyl)phosphonate, neodymium (2-ethylhexyl) butylphosphonate, neodymium (1-methylheptyl) (2-ethylhexyl)phosphonate, neodymium (2-ethylhexyl) (1-methylheptyl) phosphonate, neodymium (2-ethylhexyl) (p-nonylphenyl) phosphonate, and neodymium (p-nonylphenyl) (2-ethylhexyl)phosphonate.

Neodymium organophosphinates include neodymium butylphosphinate, neodymium pentylphosphinate, neodymium hexylphosphinate, neodymium heptylphosphinate, neodymium octylphosphinate, neodymium (1-methylheptyl) phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium his (1-methylheptyl)phosphinate, neodymium his (2-ethylhexyl) phosphinate, neodymium didecylphosphinate, neodymium didodecylphosphinate, neodymium dioctadecylphosphinate, neodymium dioleylphosphinate, neodymium diphenylphosphinate, neodymium his (p-nonylphenyl) phosphinate, neodymium butyl(2-ethylhexyl)phosphinate, neodymium (1-methylheptyl)(2-ethylhexyl)phosphinate, and neodymium (2-ethylhexyl)(p-nonylphenyl)phosphinate.

Neodymium carbamates include neodymium dimethylcarbamate, neodymium diethylcarbamate, neodymium diisopropylcarbamate, neodymium dibutylcarbamate, and neodymium dibenzylcarbamate.

Neodymium dithiocarbamates include neodymium dimethyldithiocarbamate, neodymium diethyldithiocarbamate, neodymium diisopropyldithiocarbamate, neodymium dibutyldithiocarbamate, and neodymium dibenzyldithiocarbamate.

Neodymium xanthates include neodymium methylxanthate, neodymium ethylxanthate, neodymium isopropylxanthate, neodymium butylxanthate, and neodymium benzylxanthate.

Neodymium β-diketonates include neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Neodymium alkoxides or aryloxides include neodymium methoxide, neodymium ethoxide, neodymium isopropoxide, neodymium 2-ethylhexoxide, neodymium phenoxide, neodymium nonylphenoxide, and neodymium naphthoxide.

Neodymium halides include neodymium fluoride, neodymium chloride, neodymium bromide, and neodymium iodide. Suitable neodymium pseudo-halides include neodymium cyanide, neodymium cyanate, neodymium thiocyanate, neodymium azide, and neodymium ferrocyanide. Suitable neodymium oxyhalides include neodymium oxyfluoride, neodymium oxychloride, and neodymium oxybromide. Where neodymium halides, neodymium oxyhalides, or other neodymium compounds containing labile halogen atoms are employed, the neodymium-containing compound can also serve as the halogen-containing compound.

The term organolanthanide compound may refer to any lanthanide compound containing at least one lanthanide-carbon bond. These compounds are predominantly, though not exclusively, those containing cyclopentadienyl (Cp), substituted cyclopentadienyl, allyl, and substituted allyl ligands. Suitable organolanthanide compounds include $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group.

Various alkylating agents, or mixtures thereof, can be used. In one or more embodiments, alkylating agents, which may also be referred to as hydrocarbylating agents, include organometallic compounds that can transfer hydrocarbyl groups to another metal. Typically, these agents include organometallic compounds of electropositive metals such as Groups 1, 2, and 3 metals (Groups IA, IIA, and IIIA metals). In one or more embodiments, alkylating agents include organoaluminum and organomagnesium compounds. Where the alkylating agent includes a labile halogen atom, the alkylating agent may also serve as the halogen-containing compound.

The term "organoaluminum compound" may refer to any aluminum compound containing at least one aluminum-carbon bond. In one or more embodiments, organoaluminum compounds may be soluble in a hydrocarbon solvent.

In one or more embodiments, organoaluminum compounds include those represented by the formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. In one or more embodiments, each R may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, and phosphorus atoms.

Organoaluminum compounds include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds.

Trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris (2-ethylhexyl) aluminum, tricyclohexylaluminum, tris (1-methylcyclopentyl) aluminum, triphenylaluminum, tri-p-tolylaluminum, tris (2,6-dimethylphenyl) aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Hydrocarbylaluminum dihydrides include ethylaluminum dihydride, n-propylaluminum dihydride, isopropylaluminum dihydride, n-butylaluminum dihydride, isobutylaluminum dihydride, and n-octylaluminum dihydride.

Dihydrocarbylaluminum chloride compounds include diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Hydrocarbylaluminum dichloride include ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum his (oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of organoaluminum compounds include aluminoxanes. Aluminoxanes include oligomeric linear aluminoxanes that can be represented by the general formula:

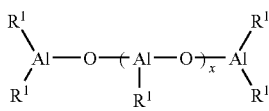

and oligomeric cyclic aluminoxanes that can be represented by the general formula:

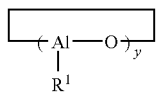

where x may be an integer of 1 to about 100, and in other embodiments about 10 to about 50; y may be an integer of 2 to about 100, and in other embodiments about 3 to about 20; and where each $R^1$, which may be the same or different, may be a mono-valent organic group that is attached to the aluminum atom via a carbon atom. In one or more embodiments, each $R^1$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound may be dissolved in an organic solvent and then contacted with water, (2) a method in which the trihydrocarbylaluminum compound may be reacted with water of crystallization contained in, for example, metal salts, or water adsorbed in inorganic or organic compounds, and (3) a method in which the trihydrocarbylaluminum compound may be reacted with water in the presence of the monomer or monomer solution that is to be polymerized.

Aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, 2,6-dimethylphenylaluminoxane, and the like, and mixtures thereof. Modified methylaluminoxane can be formed by substituting about 20-80% of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one embodiment, methylaluminoxane and at least one other organoaluminum compound (e.g., $AlR_nX_{3-n}$), such as diisobutyl aluminum hydride, are employed in combination. U.S. Ser. No. 60/877,535, which is incorporated herein by reference, provides other examples where aluminoxanes and organoaluminum compounds are employed in combination.

The term organomagnesium compound may refer to any magnesium compound that contains at least one magnesium-carbon bond. Organomagnesium compounds may be soluble in a hydrocarbon solvent. One class of organomagnesium compounds that can be utilized may be represented by the formula $MgR_2$, where each R, which may be the same or different, is a mono-valent organic group, with the proviso that the group is attached to the magnesium atom via a carbon atom. In one or more embodiments, each R may be a hydrocarbyl group, and the resulting organomagnesium compounds are dihydrocarbylmagnesium compounds. Examples of the hydrocarbyl groups include, but are not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups. These hydrocarbyl groups may contain heteroatoms such as, but not limited to, nitrogen, oxygen, silicon, sulfur, and phosphorus atom.

Examples of suitable dihydrocarbylmagnesium compounds include diethylmagnesium, di-n-propylmagnesium, diisopropylmagnesium, dibutylmagnesium, dihexylmagnesium, diphenylmagnesium, dibenzylmagnesium, and mixtures thereof.

Another class of organomagnesium compounds that can be utilized include those that may be represented by the formula RMgX, where R is a mono-valent organic group, with the proviso that the group is attached to the magnesium atom via a carbon atom, and X is a hydrogen atom, a halogen atom, a carboxylate group, an alkoxide group, or an aryloxide group. In one or more embodiments, R may be a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups. These hydrocarbyl groups may contain heteroatoms such as, but not limited to, nitrogen, oxygen, boron, silicon, sulfur, and phosphorus atoms. In one or more embodiments, X is a carboxylate group, an alkoxide group, or an aryloxide group.

Exemplary types of organomagnesium compounds that can be represented by the formula RMgX include, but are not limited to, hydrocarbylmagnesium hydride, hydrocarbylmagnesium halide, hydrocarbylmagnesium carboxylate, hydrocarbylmagnesium alkoxide, hydrocarbylmagnesium aryloxide, and mixtures thereof.

Specific examples of organomagnesium compounds that may be represented by the formula RMgX include methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and the like, and mixtures thereof.

Various halogen-containing compounds, or mixtures thereof, that contain one or more labile halogen atoms can be employed. Examples of halogen atoms include, but are not limited to, fluorine, chlorine, bromine, and iodine. A combination of two or more halogen-containing compounds having different halogen atoms can also be utilized. In one or more embodiments, the halogen-containing compounds may be soluble in a hydrocarbon solvent. In other embodiments, hydrocarbon-insoluble halogen-containing compounds, which can be suspended in the polymerization medium to form the catalytically active species, may be useful.

Suitable types of halogen-containing compounds include, but are not limited to, elemental halogens, mixed halogens, hydrogen halides, organic halides, inorganic halides, metallic halides, organometallic halides, and mixtures thereof.

Elemental halogens include fluorine, chlorine, bromine, and iodine. Mixed halogens include iodine monochloride, iodine monobromide, iodine trichloride, and iodine pentafluoride.

Hydrogen halides include hydrogen fluoride, hydrogen chloride, hydrogen bromide, and hydrogen iodide.

Organic halides include t-butyl chloride, t-butyl bromides, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Inorganic halides include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Metallic halides include tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Organometallic halides include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

In yet other embodiments, a compound containing a non-coordinating anion, or a non-coordinating anion precursor, i.e., a compound that can undergo a chemical reaction to form a non-coordinating anion, may be employed in lieu of a halogen-containing compound. Compounds containing non-coordinating anions are known in the art. In general, non-coordinating anions are sterically bulky anions that do not form coordinate bonds with, for example, the active center of a catalyst system due to steric hindrance. Exemplary non-coordinating anions include tetraarylborate anions and fluorinated tetraarylborate anions. Compounds containing a non-coordinating anion also contain a counter cation such as a carbonium, ammonium, or phosphonium cation. Exemplary counter cations include triarylcarbonium cations and N,N-dialkylanilinium cations. Examples of compounds containing a non-coordinating anion and a counter cation include triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis(trifluoromethyl)phenyl]borate.

Non-coordinating anion precursors include compounds that can form a non-coordinating anion under reaction conditions. Exemplary non-coordinating anion precursors include triarylboron compounds, $BR_3$, where R is a strong electron-withdrawing aryl group such as a pentafluorophenyl or 3,5-bis(trifluoromethyl)phenyl group.

In one or more embodiments, dihydrocarbyl ethers include those compounds represented by the formula R—O—R, where each R, which may be the same or different, is a hydrocarbyl group or substituted hydrocarbyl group. The hydrocarbyl group may contain heteroatoms such as, but not limited to, nitrogen, oxygen, silicon, tin, sulfur, boron, and phosphorous atoms. Examples of hydrocarbyl groups or substituted hydrocarbyl groups include, but are not limited to, alkyl, cycloalkyl, substituted cycloalkyl, alkenyl, cycloalkenyl, aryl, substituted aryl groups and heterocyclic groups.

Exemplary alkyl groups include methyl, ethyl, n-propyl, isopropyl, n-butyl, isobutyl, t-butyl, n-pentyl, isopentyl, neopentyl, n-hexyl, n-heptyl, 2-ethylhexyl, n-octyl, n-nonyl, and n-decyl groups.

Exemplary cycloalkyl groups include cyclopropyl, cyclobutyl, cyclopentyl, cyclohexyl, 2-methylcyclohexyl, 2-t-butylcyclohexyl and 4-t-butylcyclohexyl groups.

Exemplary aryl groups include phenyl, substituted phenyl, biphenyl, substituted biphenyl, bicyclic aryl, substituted bicyclic aryl, polycyclic aryl, and substituted polycyclic aryl groups. Substituted aryl groups include those where a hydrogen atom is replaced by a mono-valent organic group such as a hydrocarbyl group.

Exemplary substituted phenyl groups include 2-methylphenyl, 3-methylphenyl, 4-methylphenyl, 2,3-dimethylphenyl, 3,4-dimethylphenyl, 2,5-dimethylphenyl, 2,6-dimethylphenyl, and 2,4,6-trimethylphenyl (also called mesityl) groups.

Exemplary bicyclic or polycyclic aryl groups include 1-naphthyl, 2-napthyl, 9-anthryl, 9-phenanthryl, 2-benzo[b]thienyl, 3-benzo[b]thienyl, 2-naphtho[2,3-b]thienyl, 2-thianthrenyl, 1-isobenzofuranyl, 2-xanthenyl, 2-phenoxathiinyl, 2-indolizinyl, N-methyl-2-indolyl, N-methyl-indazol-3-yl, N-methyl-8-purinyl, 3-isoquinolyl, 2-quinolyl, 3-cinnolinyl, 2-pteridinyl, N-methyl-2-carbazolyl, N-methyl-β-carbolin-3-yl, 3-phenanthridinyl, 2-acridinyl, 1-phthalazinyl, 1,8-naphthyridin-2-yl, 2-quinoxalinyl, 2-quinazolinyl, 1,7-phenanthrolin-3-yl, 1-phenazinyl, N-methyl-2-phenothiazinyl, 2-phenarsazinyl, and N-methyl-2-phenoxazinyl groups.

Exemplary heterocyclic groups include 2-thienyl, 3-thienyl, 2-furyl, 3-furyl, N-methyl-2-pyrrolyl, N-methyl-3-pyrrolyl, N-methyl-2-imidazolyl, 1-pyrazolyl, N-methyl-3-pyrazolyl, N-methyl-4-pyrazolyl, 2-pyridyl, 3-pyridyl, 4-pyridyl, pyrazinyl, 2-pyrimidinyl, 3-pyridazinyl, 3-isothiazolyl, 3-isoxazolyl, 3-furazanyl, 2-triazinyl, morpholinyl, thiomorpholinyl, piperidinyl, piperazinyl, pyrrolidinyl, pyrrolinyl, imidazolidinyl, and imidazolinyl groups.

Suitable types of dihydrocarbyl ethers include, but are not limited to, dialkyl ethers, dicycloalkyl ethers, diaryl ethers, and mixed dihydrocarbyl ethers.

Specific examples of dialkyl ethers include dimethyl ether, diethyl ether, di-n-propyl ether, diisopropyl ether, di-n-butyl ether, diisobutyl ether, di-t-butyl ether, di-n-pentyl ether, diisopentyl ether, dineopentyl ether, di-n-hexyl ether, di-n-heptyl ether, di-2-ethylhexyl ether, di-n-octyl ether, di-n-nonyl ether, di-n-decyl ether, and dibenzyl ether.

Specific examples of dicycloalkyl ethers include dicyclopropyl ether, dicyclobutyl ether, dicyclopentyl ether, dicyclohexyl ether, di-2-methylcyclohexyl ether, and di-2-t-butylcyclohexyl ether.

Specific examples of diaryl ethers include diphenyl ether, di-o-tolyl ether, di-m-tolyl ether, and di-p-tolyl ether.

Specific examples of mixed dihydrocarbyl ethers include n-butyl methyl ether, isobutyl methyl ether, sec-butyl methyl ether, t-butyl methyl ether, n-butyl ethyl ether, isobutyl ethyl ether, sec-butyl ethyl ether, t-butyl ethyl ether, t-amyl methyl ether, t-amyl ethyl ether, phenyl ethyl ether, phenyl n-propyl ether, phenyl isopropyl ether, phenyl n-butyl ether, phenyl isobutyl ether, phenyl n-octyl ether, p-tolyl ethyl ether, p-tolyl n-propyl ether, p-tolyl isopropyl ether, p-tolyl n-butyl ether, p-tolyl isobutyl ether, p-tolyl t-butyl ether, p-tolyl n-octyl ether, benzyl n-ethyl ether, benzyl n-propyl ether, benzyl isopropyl ether, benzyl n-butyl ether, benzyl isobutyl ether, benzyl t-butyl ether, and benzyl n-octyl ether.

In one or more embodiments, one or both of the hydrocarbyl groups (R) in the dihydrocarbyl ether may contain one or more additional ether linkages (i.e., C—O—C). These ether compounds may be referred to as polyethers. Specific examples of polyethers include glyme ethers such as ethylene glycol dimethyl ether (also called monoglyme), ethylene glycol diethyl ether, diethylene glycol dimethyl ether (also called diglyme), diethylene glycol diethyl ether, diethylene glycol di-n-butyl ether, triethylene glycol dimethyl ether (also called triglyme), triethylene glycol diethyl ether, tetraethylene glycol dimethyl ether (also called tetraglyme), and tetraethylene glycol diethyl ether.

The catalyst composition of this invention may be formed by combining or mixing the foregoing catalyst ingredients. Although one or more active catalyst species are believed to result from the combination of the catalyst ingredients, the degree of interaction or reaction between the various catalyst ingredients or components is not known with any great degree of certainty. The combination or reaction product of the lanthanide compound, alkylating agent, and halogen-containing compound is conventionally referred to as a catalyst system or catalyst composition. The dihydrocarbyl ether, as used herein, may be referred to as a component of that system or as a modifier to that system. In this respect, reference to catalyst ingredients refers to the lanthanide compound, the alkylating agent, the halogen-containing compound, and the dihydrocarbyl ether. The term modified catalyst composition or modified catalyst system may be employed to encompass a simple mixture of the ingredients, a complex of the various ingredients that is caused by physical or chemical forces of attraction, a chemical reaction product of the ingredients, or a combination of the foregoing.

The catalyst composition of this invention advantageously has a technologically useful catalytic activity for polymerizing conjugated dienes into polydienes over a wide range of catalyst concentrations and catalyst ingredient ratios. Several factors may impact the optimum concentration of any one of the catalyst ingredients. For example, because the catalyst ingredients may interact to form an active species, the optimum concentration for any one catalyst ingredient may be dependent upon the concentrations of the other catalyst ingredients.

In one or more embodiments, the molar ratio of the alkylating agent to the lanthanide compound (alkylating agent/Ln) can be varied from about 1:1 to about 1,000:1, in other embodiments from about 2:1 to about 500:1, and in other embodiments from about 5:1 to about 200:1.

In those embodiments where both an aluminoxane and at least one other organoaluminum agent are employed as alkylating agents, the molar ratio of the aluminoxane to the lanthanide compound (aluminoxane/Ln) can be varied from 5:1 to about 1,000:1, in other embodiments from about 10:1 to about 700:1, and in other embodiments from about 20:1 to about 500:1; and the molar ratio of the at least one other organoaluminum compound to the lanthanide compound (Al/Ln) can be varied from about 1:1 to about 200:1, in other embodiments from about 2:1 to about 150:1, and in other embodiments from about 5:1 to about 100:1.

The molar ratio of the halogen-containing compound to the lanthanide compound is best described in terms of the ratio of the moles of halogen atoms in the halogen-containing compound to the moles of lanthanide atoms in the lanthanide compound (halogen/Ln). In one or more embodiments, the halogen/Ln molar ratio can be varied from about 0.5:1 to about 20:1, in other embodiments from about 1:1 to about 10:1, and in other embodiments from about 2:1 to about 6:1.

In relevant embodiments, the molar ratio of the non-coordinating anion or non-coordinating anion precursor to the lanthanide compound (An/Ln) may be from about 0.5:1 to about 20:1, in other embodiments from about 0.75:1 to about 10:1, and in other embodiments from about 1:1 to about 6:1.

In one or more embodiments, the molar ratio of the dihydrocarbyl ether to the lanthanide compound (ether/Ln) can be varied from 0.5:1 to about 1,000:1, in other embodiments from about 1:1 to about 700:1, and in other embodiments from about 5:1 to about 500:1.

The lanthanide-based catalyst can be formed by employing several techniques. For example, the catalyst may be formed by adding the catalyst components directly to the monomer to be polymerized. In this respect, the catalyst components including the dihydrocarbyl ether may be added either in a stepwise or simultaneous manner. In one embodiment, when the catalyst ingredients are added in a stepwise manner, the dihydrocarbyl ether can be added first, followed by the alkylating agent, followed by the lanthanide compound, and ultimately followed by the halogen-containing compound. The addition of the catalyst components directly and individually to the monomer to be polymerized may be referred to as an in situ formation of the catalyst system.

In other embodiments, the catalyst may be preformed. That is, the catalyst ingredients including the dihydrocarbyl ether may be introduced and pre-mixed outside of the monomer to be polymerized. In particular embodiments, the preformation of the catalyst may occur either in the absence of any monomer or in the presence of a small amount of at least one conjugated diene monomer at an appropriate temperature, which is generally from about −20° C. to about 80° C. Mixtures of conjugated diene monomers may also be used. The amount of conjugated diene monomer that may be used for preforming the catalyst can range from about 1 to about 500 moles, in other embodiments from about 5 to about 250 moles, and in other embodiments from about 10 to about 100 moles per mole of the lanthanide compound. The resulting preformed catalyst composition can be aged, if desired, prior to being added to the monomer that is to be polymerized.

In other embodiments, the catalyst may be formed by using a two-stage procedure. The first stage can involve combining the lanthanide compound with the alkylating agent either in the absence of any monomer or in the presence of a small amount of at least one conjugated diene monomer at an appropriate temperature (e.g.,-20° C. to about 80° C.). The amount of monomer employed in preparing this first-stage mixture may be similar to that set forth above for preforming the catalyst. In the second stage, the mixture prepared in the first stage, the dihydrocarbyl ether, and the halogen-containing compound can be added in either a stepwise or simultaneous manner to the monomer that is to be polymerized. In one embodiment, the dihydrocarbyl ether can be added first, followed by the mixture prepared in the first stage, and then followed by the halogen-containing compound.

In one or more embodiments, a solvent may be employed as a carrier to either dissolve or suspend the catalyst or catalyst ingredients in order to facilitate the delivery of the catalyst or catalyst ingredients to the polymerization system. In other embodiments, conjugated diene monomer can be used as the catalyst carrier. In yet other embodiments, the catalyst ingredients can be used in their neat state without any solvent.

In one or more embodiments, suitable solvents include those organic compounds that will not undergo polymerization or incorporation into propagating polymer chains during the polymerization of monomer in the presence of catalyst. In one or more embodiments, these organic species are liquid at ambient temperature and pressure. In one or more embodiments, these organic solvents are inert to the catalyst. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain incorporated in the polymer.

The production of polydienes according to this invention can be accomplished by polymerizing conjugated diene monomer in the presence of a catalytically effective amount of the foregoing catalyst composition. The introduction of the catalyst composition, the conjugated diene monomer, and any solvent if employed forms a polymerization mixture in which the polymer product is formed. The total catalyst concentration to be employed in the polymerization mixture may depend on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients can be used. In one or more embodiments, the amount of the lanthanide compound used can be varied from about 0.01 to about 2 mmol, in other embodiments from about 0.02 to about 1 mmol, and in other embodiments from about 0.05 to about 0.5 mmol per 100 g of conjugated diene monomer.

In one or more embodiments, the polymerization of conjugated diene monomer according to this invention may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst is usually added to the polymerization system. The additional solvent may be the same as or different from the solvent used in preparing the catalyst. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

In other embodiments, the polymerization system employed may be generally considered a bulk polymerization system that includes substantially no solvent or a minimal amount of solvent. Those skilled in the art will appreciate the benefits of bulk polymerization processes (i.e., processes where monomer acts as the solvent), and therefore the polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In still another embodiment, the polymerization mixture is substantially devoid of solvent, which refers to the absence of that amount of solvent that would otherwise have an appreciable impact on the polymerization process. Polymerization systems that are substantially devoid of solvent may be referred to as including substantially no solvent. In particular embodiments, the polymerization mixture is devoid of solvent.

The polymerization may be conducted in any conventional polymerization vessels known in the art. In one or more embodiments, solution polymerization can be conducted in a conventional stirred-tank reactor. In other embodiments, bulk polymerization can be conducted in a conventional stirred-tank reactor, especially if the monomer conversion is less than about 60%. In still other embodiments, especially where the monomer conversion in a bulk polymerization process is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose. Examples of useful bulk polymerization processes are disclosed in U.S. Publication No. 2005/0197474 A1, which is incorporated herein by reference.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

The polydienes produced by the polymerization process of this invention may possess pseudo-living characteristics, such that some of polymer chains in these polymers have reactive chain ends. Once a desired monomer conversion is achieved, a functionalizing agent may optionally be introduced into the polymerization mixture to react with any reactive polymer chains so as to give a functionalized polymer. In one or more embodiments, the functionalizing agent is introduced prior to contacting the polymerization mixture with a quenching agent. In other embodiments, the functionalizing may be introduced after the polymerization mixture has been partially quenched with a quenching agent.

In one or more embodiments, functionalizing agents include compounds or reagents that can react with a reactive polymer produced by this invention and thereby provide the polymer with a functional group that is distinct from a propagating chain that has not been reacted with the functionalizing agent. The functional group may be reactive or interactive with other polymer chains (propagating and/or non-propagating) or with other constituents such as reinforcing fillers (e.g. carbon black) that may be combined with the polymer. In one or more embodiments, the reaction between the functionalizing agent and the reactive polymer proceeds via an addition or substitution reaction.

Useful functionalizing agents may include compounds that simply provide a functional group at the end of a polymer chain without joining two or more polymer chains together, as well as compounds that can couple or join two or more polymer chains together via a functional linkage to form a single macromolecule. The latter type of functionalizing agents may also be referred to as coupling agents.

In one or more embodiments, functionalizing agents include compounds that will add or impart a heteroatom to the polymer chain. In particular embodiments, functionalizing agents include those compounds that will impart a functional group to the polymer chain to form a functionalized polymer that reduces the 50° C. hysteresis loss of a carbon-black filled vulcanizates prepared from the functionalized polymer as compared to similar carbon-black filled vulcanizates prepared from non-functionalized polymer. In one or more embodiments, this reduction in hysteresis loss is at least 5%, in other embodiments at least 10%, and in other embodiments at least 15%.

In one or more embodiments, suitable functionalizing agents include those compounds that contain groups that may react with pseudo-living polymers (e.g., those produced in accordance with this invention). Exemplary functionalizing agents include ketones, quinones, aldehydes, amides, esters, isocyanates, isothiocyanates, epoxides, imines, aminoketones, aminothioketones, and acid anhydrides. Examples of these compounds are disclosed in U.S. Pat. Nos. 4,906,706, 4,990,573, 5,064,910, 5,567,784, 5,844,050, 6838,526, 6977, 281, and 6,992,147; U.S. Pat. Publication Nos. 2006/0004131 A1, 2006/0025539 A1, 2006/0030677 A1, and 2004/0147694 A1; Japanese Patent Application Nos. 05-051406A, 05-059103A, 10-306113A, and 11-035633A; which are incorporated herein by reference. Other examples of functionalizing agents include azine compounds as described in U.S. Ser. No. 11/640,711, hydrobenzamide compounds as disclosed in U.S. Ser. No. 11/710,713, nitro compounds as disclosed in U.S. Ser. No. 11/710,845, and protected oxime compounds as disclosed in U.S. Ser. No. 60/875, 484, all of which are incorporated herein by reference.

In particular embodiments, the functionalizing agents employed may be coupling agents which include, but are not limited to, metal halides such as tin tetrachloride, metalloid halides such as silicon tetrachloride, metal ester-carboxylate complexes such as dioctyltin bis(octylmaleate), alkoxysilanes such as tetraethyl orthosilicate, and alkoxystannanes such as tetraethoxytin. Coupling agents can be employed either alone or in combination with other functionalizing agents. The combination of functionalizing agents may be used in any molar ratio.

The amount of functionalizing agent introduced to the polymerization mixture may depend upon various factors including the type and amount of catalyst used to initiate the polymerization, the type of functionalizing agent, the desired level of functionality and many other factors. In one or more embodiments, the amount of functionalizing agent may be in a range of from about 1 to about 200 moles, in other embodiments from about 5 to about 150 moles, and in other embodiments from about 10 to about 100 moles per mole of the lanthanide compound.

Because reactive polymer chains may slowly self-terminate at high temperatures, in one embodiment the functionalizing agent may be added to the polymerization mixture once a peak polymerization temperature is observed. In other embodiments, the functionalizing agent may be added within about 25 to 35 minutes after the peak polymerization temperature is reached.

In one or more embodiments, the functionalizing agent may be introduced to the polymerization mixture after a desired monomer conversion is achieved but before a quenching agent containing a protic hydrogen atom is added. In one or more embodiments, the functionalizing agent is added to the polymerization mixture after a monomer conversion of at least 5%, in other embodiments at least 10%, in other embodiments at least 20%, in other embodiments at least 50%, and in other embodiments at least 80%. In these or other embodiments, the functionalizing agent is added to the polymerization mixture prior to a monomer conversion of 90%, in other embodiments prior to 70% monomer conversion, in other embodiments prior to 50% monomer conversion, in other embodiments prior to 20% monomer conversion, and in other embodiments prior to 15%. In one or more embodiments, the functionalizing agent is added after complete, or substantially complete monomer conversion. In particular embodiments, a functionalizing agent may be introduced to the polymerization mixture immediately prior to, together with, or after the introduction of a Lewis base as disclosed in co-pending U.S. Ser. No. 11/890,590, filed on Aug. 7, 2007, which is incorporated herein by reference.

In one or more embodiments, the functionalizing agent may be introduced to the polymerization mixture at a location (e.g., within a vessel) where the polymerization (or at least a portion thereof) has been conducted. In other embodiments, the functionalizing agent may be introduced to the polymerization mixture at a location that is distinct from where the polymerization (or at least a portion thereof) has taken place. For example, the functionalizing agent may be introduced to the polymerization mixture in downstream vessels including downstream reactors or tanks, in-line reactors or mixers, extruders, or devolatilizers.

Once a functionalizing agent has been introduced to the polymerization mixture and a desired reaction time has been provided, a quenching agent can be added to the polymerization mixture in order to inactivate any residual reactive polymer chains and the catalyst or catalyst components. The quenching agent may be a protic compound, which includes, but is not limited to, an alcohol, a carboxylic acid, an inorganic acid, water, or a mixture thereof. In particular embodiments, the quenching agent includes a polyhydroxy compound as disclosed in copending U.S. Ser. No. 11/890,591, filed on Aug. 7, 2007, which is incorporated herein by reference. An antioxidant such as 2,6-di-t-butyl-4-methylphenol may be added along with, before, or after the addition of the quenching agent. The amount of the antioxidant employed may be in the range of about 0.2% to about 1% by weight of the polymer product. The quenching agent and the antioxidant may be added as neat materials or, if necessary, dissolved in a hydrocarbon solvent or conjugated diene monomer prior to being added to the polymerization mixture Once the polymerization mixture has been quenched, the various constituents of the polymerization mixture may be recovered. In one or more embodiments, the unreacted monomer can be recovered from the polymerization mixture. For example, the monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process.

The polymer product may be recovered from the polymerization mixture by using techniques known in the art. In one or more embodiments, desolventization and drying techniques may be used. For instance, the polymer can be recovered by passing the polymerization mixture through a heated screw apparatus, such as a desolventizing extruder, in which the volatile substances are removed by evaporation at appropriate temperatures (e.g., about 100° C. to about 170° C.) and under atmospheric or sub-atmospheric pressure. This treatment serves to remove unreacted monomer as well as any low-boiling solvent. Alternatively, the polymer can also be recovered by subjecting the polymerization mixture to steam desolventization, followed by drying the resulting polymer crumbs in a hot air tunnel. The polymer can also be recovered by directly drying the polymerization mixture on a drum dryer.

Where cis-1,4-polydienes (e.g., cis-1,4-polybutadiene) are produced by one or more embodiments of the process of this invention, the cis-1,4-polydienes may advantageously have a cis-1,4 linkage content in excess of 96%, in other embodiments in excess of 97%, in other embodiments in excess of 98%, and in other embodiments in excess of 99%. Advantageously, these polymers exhibit excellent viscoelastic properties and are particularly useful in the manufacture of various tire components including, but not limited to, tire treads, sidewalls, subtreads, and bead fillers. The cis-1,4-polydienes can be used as all or part of the elastomeric component of a tire stock. When the cis-1,4-polydienes are used in conjunction with other rubbers to form the elastomeric component of a tire stock, these other rubbers may be natural rubber, synthetic rubbers, and mixtures thereof. Examples of synthetic rubber include polyisoprene, poly(styrene-co-butadiene), polybutadiene with low cis-1,4-linkage content, poly(styrene-co-butadiene-co-isoprene), and mixtures thereof. The cis-1,4-polydienes can also be used in the manufacture of hoses, belts, shoe soles, window seals, other seals, vibration damping rubber, and other industrial products.

In order to demonstrate the practice of the present invention, the following examples have been prepared and tested. The examples should not, however, be viewed as limiting the scope of the invention. The claims will serve to define the invention.

EXAMPLES

In the following examples, the Mooney viscosities ($ML_{1+4}$) of the polymer samples were determined at 100° C. by using a Monsanto Mooney viscometer with a large rotor, a one-minute warm-up time, and a four-minute running time. The number average ($M_n$) and weight average ($M_w$) molecular weights and molecular weight distributions ($M_w/M_n$) of the polymer samples were determined by gel permeation chromatography (GPC) calibrated with polystyrene standards and Mark-Houwink constants for the polymers in question. The cis-1,4-linkage, trans-1,4-linkage, and 1,2-linkage contents of the polymer samples were determined by Infrared spectroscopy

Example 1

In Example 1, which is a control experiment, the solution polymerization of 1,3-butadiene to form cis-1,4-polybutadiene is catalyzed by a neodymium-based catalyst system that is devoid of an ether compound. An oven-dried 800-mL glass bottle was capped with a self-sealing rubber liner and a perforated metal cap. After the bottle was thoroughly purged with a stream of dry nitrogen, the bottle was charged with 106 g of hexanes and 227 g of a 1,3-butadiene/hexanes blend containing 22.1% by weight of 1,3-butadiene. The following catalyst ingredients were then charged into the bottle in the following order: (1) 3.0 mL of 0.68 M triisobutylaluminum (TIBA) in hexane, (2) 0.90 mL of 0.0944 M neodymium(III) versatate (hereinafter NdV) in hexane, and (3) 0.80 mL of 0.159 M ethylaluminum dichloride (EADC) in hexane. The bottle was tumbled for 50 minutes in a water bath maintained at 80° C. The polymerization was terminated by addition of 3 mL of isopropanol containing 0.30 g of 2,6-di-tert-butyl-4-methylphenol. The resulting polymer cement was coagulated with 3 liters of isopropanol containing 0.5 g of 2,6-di-tert-butyl-4-methylphenol, and then drum-dried. The yield of the polymer was 48.6 g (97.2%). The properties of the resulting cis-1,4-polybutadiene are summarized in Table 1.

TABLE I

|  | Example | | | | |
|---|---|---|---|---|---|
|  | 1 | 2 | 3 | 4 | 5 |
| n-Bu$_2$O/Nd molar ratio | 0:1 | 1.0:1 | 3.0:1 | 5.0:1 | 7.0:1 |
| Polymer yield | 97.2% | 96.4% | 94.4% | 89.0% | 79.2% |
| ML | 34.8 | 31.7 | 29.9 | 30.7 | 28.1 |
| T80 | 4.3 | 4.0 | 4.3 | 4.0 | 4.3 |
| $M_n$ | 101,200 | 102,600 | 105,400 | 105,700 | 100,900 |
| $M_w$ | 322,100 | 291,200 | 286,800 | 307,400 | 320,500 |
| $M_w/M_n$ | 3.2 | 2.8 | 2.7 | 2.9 | 3.2 |
| % cis | 97.1 | 97.2 | 97.5 | 97.8 | 98.1 |
| % trans | 2.1 | 2.0 | 1.7 | 1.3 | 1.1 |
| % vinyl | 0.8 | 0.8 | 0.8 | 0.9 | 0.8 |

Examples 2-5

In Examples 2-5, which were conducted in parallel to Example 1 (control), the solution polymerization of 1,3-butadiene to form cis-1,4-polybutadiene is catalyzed by a neodymium-based catalyst system that includes di-n-butyl ether (n-Bu$_2$O) as a catalyst ingredient. The same procedure as used in Example 1 was used except that n-Bu$_2$O was added as an additional catalyst ingredient. The amounts of neat n-Bu$_2$O used in Examples 2-5 were 0.0145 mL, 0.0435 mL, 0.0725 mL, and 0.101 mL, respectively, in order to vary the molar ratio of n-Bu$_2$O/Nd. The catalyst ingredients were added to the 1,3-butadiene monomer solution in bottles in the following order: (1) n-Bu$_2$O, (2) TIBA, (3) NdV, and (4) EADC. The properties of the resulting cis-1,4-polybutadiene are summarized in Table 1.

A comparison of the results obtained in Examples 2-5 with those obtained in Example 1 (control) indicates that the addition of n-Bu$_2$O as a catalyst component in Examples 2-5 increases the cis-1,4-linkage content of the resulting cis-1,4-polybutadiene.

Example 6

In Example 6, the bulk polymerization of 1,3-butadiene to form cis-1,4-polybutadiene is catalyzed by a neodymium-based catalyst system that includes n-Bu$_2$O. The polymerization reactor consisted of a one-gallon stainless cylinder equipped with a mechanical agitator (shaft and blades) capable of mixing high viscosity polymer cement. The top of the reactor was connected to a reflux condenser system for conveying, condensing, and recycling the 1,3-butadiene vapor developed inside the reactor throughout the duration of the polymerization. The reactor was also equipped with a cooling jacket containing cold running water. The heat of polymerization was dissipated partly by internal cooling through the use of the reflux condenser system, and partly by external cooling through heat transfer to the cooling jacket.

The reactor was thoroughly purged with a stream of dry nitrogen, which was then replaced with 1,3-butadiene vapor by charging 100 g of dry 1,3-butadiene monomer to the reactor, heating the reactor to 65° C., and then venting the 1,3-butadiene vapor from the top of the reflux condenser system until no liquid 1,3-butadiene remained in the reactor. Cooling water was applied to the reflux condenser and the reactor jacket, and 1302 g of 1,3-butadiene monomer was charged into the reactor, followed by the addition of 19.50 mL of 0.20 M n-Bu$_2$O in hexane. After the monomer was thermostated at 32° C., the polymerization was initiated by charging into the reactor a preformed catalyst that had been prepared by mixing 5.20 mL of 1.5 M methylaluminoxane (MAO) in toluene, 6.5 g of 20.6 wt % 1,3-butadiene in hexane, 1.44 mL of 0.054 M NdV in hexane, 3.12 mL of 1.0 M diisobutylaluminum hydride (DIBAH) in hexane, and 1.56 mL of 0.2 M diethylaluminum chloride (DEAC) in hexane. After 13 minutes from its commencement, the polymerization was terminated by addition of 4.6 mL of isopropanol dissolved in 1360 g of hexane. The polymerization mixture was coagulated with 3 gallons of isopropanol containing 5 g of 2,6-di-tert-butyl-4-methylphenol and then drum-dried. The yield of the polymer was 130.2 g. The resulting polymer had the following properties: $ML_{1+4}$=23.0, $M_n$=96,000, $M_w$=363,000, $M_w/M_n$=3.8, cis-1,4-linkage=99.1%, trans-1,4-linkage=0.6%, and 1,2-linkage=0.3%.

Example 7

Comparative Example to Example 6

In Example 7, a bulk polymerization experiment similar to that described in Example 6 was conducted except that no n-Bu$_2$O was used. The polymerization was excessively fast, and the temperature rose rapidly. In less than two minutes, the reactor was fouled with insoluble gelled polymer. At this point, in order to avoid a runaway reaction, the polymerization was terminated by adding 4.6 mL of isopropanol dissolved in 1360 g of hexane. After the polymerization mixture was discharged from the reactor, visual inspection of the interior of the reactor revealed that severe reactor fouling had occurred. Specifically, the wall of the reactor as well as the shaft and blades of the agitator were coated with insoluble gelled polymer lumps. Due to the fouling, the reactor had to be opened for cleaning.

A comparison of the results obtained in Example 6 with those obtained in Example 7 (comparative example) indicates that the polymerization rate in Example 6 is moderated by the addition of n-Bu$_2$O as a catalyst component, thereby facilitating the temperature control and reducing the risk of a runaway reaction in bulk polymerization.

Example 8

In Example 8, a bulk polymerization experiment similar to that described in Example 6 was conducted except that iodoform (CHI3) was used instead of DEAC. The reactor was charged with 1302 g of 1,3-butadiene monomer and 14.82 mL of 0.20 M n-Bu$_2$O in hexane. After the monomer was thermostated at 32° C., the polymerization was initiated by charging into the reactor a preformed catalyst that had been prepared by mixing 5.20 mL of 1.5 M MAO in toluene, 6.5 g of 20.6 wt % 1,3-butadiene in hexane, 1.44 mL of 0.054 M NdV in hexane, 2.34 mL of 1.0 M DIBAH in hexane, and 6.24 mL of 0.017 M iodoform (CHI3) in hexane. After 7 minutes from its commencement, the polymerization was terminated by addition of 4.6 mL of isopropanol dissolved in 1360 g of hexane. The polymerization mixture was coagulated with 3 gallons of isopropanol containing 5 g of 2,6-di-tert-butyl-4-methylphenol and then drum-dried. The yield of the polymer was 194.5 g (14.9% conversion). The resulting polymer had the following properties: $ML_{1+4}$=39.5, $M_n$=169,000, $M_w$=244,000, $M_w/M_n$=1.4, cis-1,4-linkage=99.0%, trans-1,4-linkage=0.7%, and 1,2-linkage content=0.3%.

Example 9

Comparative Example to Example 8

In Example 9, a bulk polymerization experiment similar to that described in Example 8 was conducted except that no n-Bu$_2$O was used. After 5.2 minutes from its commencement, the polymerization was terminated by addition of 4.6 mL of isopropanol dissolved in 1360 g of hexane. The polymerization mixture was coagulated with 3 gallons of isopropanol containing 5 g of 2,6-di-tert-butyl-4-methylphenol and then drum-dried. The yield of the polymer was 175.6 g (13.5% conversion). The resulting polymer had the following properties: $ML_{1+4}$=38.2, $M_n$=171,000, $M_w$=218,000, $M_w/M_n$=1.3, cis-1,4-linkage=98.3%, trans-1,4-linkage=1.4%, and 1,2-linkage=0.3%.

A comparison of the results obtained in Example 8 with those obtained in Example 9 (comparative example) indicates that the addition n-Bu$_2$O as a catalyst component in Example 8 increases the cis-1,4-linkage content of the resulting cis-1,4-polybutadiene. In addition, the polymerization rate can be described in terms of the % monomer conversion divided by the polymerization time (i.e., % conversion/minute), with a higher value of % conversion/minute indicating a higher polymerization rate. The values of % conversion/minute are 2.1 and 2.6%/minutes, respectively, in Examples 8 and 9, indicating that the presence of n-Bu$_2$O as a catalyst modifier in Example 8 moderates the polymerization rate, thereby facilitating the temperature control.

Various modifications and alterations that do not depart from the scope and spirit of this invention will become apparent to those skilled in the art. This invention is not to be duly limited to the illustrative embodiments set forth herein.

What is claimed is:

1. A process for preparing a polydiene, the process comprising the step of:
    polymerizing conjugated diene monomer with a lanthanide-based catalyst system including the combination of or reaction product of (a) a lanthanide compound, (b) an alkylating agent, (c) a halogen-containing compound, and (d) a dihydrocarbyl ether, where (a) the lanthanide compound, (b) the alkylating agent, (c) the halogen-containing compound, and (d) the dihydrocarbyl ether are introduced directly and individually to the monomer, and where the dihydrocarbyl ether is defined by the formula R—O—R, where each R is independently a hydrocarbyl group or substituted hydrocarbyl group selected from the group consisting of alkyl, cycloalkyl, substituted cycloalkyl, alkenyl, cycloalkenyl groups, and benzyl groups.

2. The process of claim 1, where said step of polymerizing takes place within a solution polymerization system in which both the conjugated diene monomer and the polydiene are dissolved in a solvent.

3. The process of claim 1, where said step of polymerizing takes place within a polymerization mixture that includes more than 50% by weight of solvent based on the total weight of the polymerization mixture.

4. The process of claim 1, where the molar ratio of the dihydrocarbyl ether to the lanthanide compound is from about 0.5:1 to about 1000:1.

5. The process of claim 1, where the dihydrocarbyl ether is selected from the group consisting of dialkyl ethers, dicycloalkyl ethers, mixed dihydrocarbyl ethers, polyethers, and dibenzyl ethers.

6. The process of claim 5, where the dihydrocarbyl ether is selected from the group consisting of dimethyl ether, diethyl ether, di-n-propyl ether, diisopropyl ether, di-n-butyl ether, diisobutyl ether, di-t-butyl ether, di-n-pentyl ether, diisopentyl ether, dineopentyl ether, di-n-hexyl ether, di-n-heptyl ether, di-2-ethylhexyl ether, di-n-octyl ether, di-n-nonyl ether, di-n-decyl ether, and dibenzyl ether.

7. The process of claim 6, where the dihydrocarbyl ether is selected from the group consisting of dimethyl ether, diethyl ether, di-n-propyl ether, diisopropyl ether, di-n-butyl ether, diisobutyl ether, di-t-butyl ether, di-n-pentyl ether, diisopentyl ether, dineopentyl ether, di-n-hexyl ether, di-n-heptyl ether, di-2-ethylhexyl ether, di-n-octyl ether, di-n-nonyl ether, and di-n-decyl ether.

8. The process of claim 1, where the dihydrocarbyl ether is selected from the group consisting of dicyclopropyl ether, dicyclobutyl ether, dicyclopentyl ether, dicyclohexyl ether, di-2-methylcyclohexyl ether, and di-2-t-butylcyclohexyl ether.

9. The process of claim 1, where the dihydrocarbyl ether is selected from the group consisting of n-butyl methyl ether, isobutyl methyl ether, sec-butyl methyl ether, t-butyl methyl ether, n-butyl ethyl ether, isobutyl ethyl ether, sec-butyl ethyl ether, t-butyl ethyl ether, t-amyl methyl ether, t-amyl ethyl ether, benzyl n-ethyl ether, benzyl n-propyl ether, benzyl isopropyl ether, benzyl n-butyl ether, benzyl isobutyl ether, benzyl t-butyl ether, and benzyl n-octyl ether.

10. The process of claim 1, where the dihydrocarbyl ether is selected from the group consisting of ethylene glycol dimethyl ether, ethylene glycol diethyl ether, diethylene glycol dimethyl ether, diethylene glycol diethyl ether, diethylene glycol di-n-butyl ether, triethylene glycol dimethyl ether, triethylene glycol diethyl ether, tetraethylene glycol dimethyl ether, and tetraethylene glycol diethyl ether.

11. The process of claim 1, where the alkylating agent includes an aluminoxane and a dihydrocarbylaluminum hydride or a hydrocarbylaluminum dihydride.

12. A process for preparing a polydiene, the process comprising the step of:
    (i) providing a mixture of conjugated diene monomer and a solvent, where the mixture includes more than 20% by weight of solvent based on the total weight of the mixture;
    (ii) introducing a dihydrocarbyl ether directly and individually to the mixture, where the dihydrocarbyl ether is defined by the formula R—O—R, where each R is independently a hydrocarbyl group or substituted hydrocarbyl group selected from the group consisting of alkyl, cycloalkyl, substituted cycloalkyl, alkenyl, cycloalkenyl groups, and benzyl groups; and
    (iii) polymerizing the conjugated diene monomer by using a lanthanide-based catalyst system, where the lanthanide-based catalyst system is formed by introducing (a) a lanthanide compound, (b) an alkylating agent, and optionally (c) a halogen-containing compound separate from the lanthanide compound or the alkylating agent, with the proviso that the catalyst system includes a labile halogen atom.

13. The process of claim 12, where the polymerization mixture includes more than 50% by weight of the solvent based on the total weight of the mixture.

14. The process of claim 12, where the dihydrocarbyl ether is selected from the group consisting of dialkyl ethers, dicycloalkyl ethers, mixed dihydrocarbyl ethers, polyethers, and dibenzyl ethers.

15. The process of claim 12, where the dihydrocarbyl ether is selected from the group consisting of dimethyl ether, diethyl ether, di-n-propyl ether, diisopropyl ether, di-n-butyl ether, diisobutyl ether, di-t-butyl ether, di-n-pentyl ether, diisopentyl ether, dineopentyl ether, di-n-hexyl ether, di-n-heptyl ether, di-2-ethylhexyl ether, di-n-octyl ether, di-n-nonyl ether, di-n-decyl ether, and dibenzyl ether.

16. The process of claim 15, where the dihydrocarbyl ether is selected from the group consisting of dimethyl ether, diethyl ether, di-n-propyl ether, diisopropyl ether, di-n-butyl ether, diisobutyl ether, di-t-butyl ether, di-n-pentyl ether, diisopentyl ether, dineopentyl ether, di-n-hexyl ether, di-n-heptyl ether, di-2-ethylhexyl ether, di-n-octyl ether, di-n-nonyl ether, and di-n-decyl ether.

17. The process of claim 12, where the dihydrocarbyl ether is selected from the group consisting of n-butyl methyl ether, isobutyl methyl ether, sec-butyl methyl ether, t-butyl methyl ether, n-butyl ethyl ether, isobutyl ethyl ether, sec-butyl ethyl ether, t-butyl ethyl ether, t-amyl methyl ether, t-amyl ethyl ether, benzyl n-ethyl ether, benzyl n-propyl ether, benzyl isopropyl ether, benzyl n-butyl ether, benzyl isobutyl ether, benzyl t-butyl ether, and benzyl n-octyl ether.

18. The process of claim 17, where the dihydrocarbyl ether is selected from the group consisting of n-butyl methyl ether, isobutyl methyl ether, sec-butyl methyl ether, t-butyl methyl ether, n-butyl ethyl ether, isobutyl ethyl ether, sec-butyl ethyl ether, t-butyl ethyl ether, t-amyl methyl ether, and t-amyl ethyl ether.

19. The process of claim 12, where the alkylating agent includes an aluminoxane and a dihydrocarbylaluminum hydride or a hydrocarbylaluminum dihydride.

20. The process of claim 12, where each R is independently a hydrocarbyl group selected from the group consisting of alkyl, cycloalkyl, and substituted cycloalkyl groups.

21. The process of claim 12, where the lanthanide-based catalyst system and the dihydrocarbyl ether are added to the mixture sequentially or simultaneously.

22. A process for preparing a polydiene, the process comprising the step of:
(i) providing a mixture of conjugated diene monomer and a solvent, where the mixture includes more than 20% by weight of solvent based on the total weight of the mixture;
(ii) introducing a dihydrocarbyl ether directly and individually to the mixture;
(iii) polymerizing the conjugated diene monomer by using a lanthanide-based catalyst system; where the dihydrocarbyl ether is selected from the group consisting of n-butyl methyl ether, isobutyl methyl ether, sec-butyl methyl ether, t-butyl methyl ether, n-butyl ethyl ether, isobutyl ethyl ether, sec-butyl ethyl ether, t-butyl ethyl ether, t-amyl methyl ether, t-amyl ethyl ether, benzyl n-ethyl ether, benzyl n-propyl ether, benzyl isopropyl ether, benzyl n-butyl ether, benzyl isobutyl ether, benzyl t-butyl ether, and benzyl n-octyl ether.

* * * * *